(12) United States Patent
Dornan

(10) Patent No.: US 6,568,695 B2
(45) Date of Patent: *May 27, 2003

(54) ALL TERRAIN RIDING ASSEMBLY HAVING BRAKING CAPABILITIES

(76) Inventor: Mark Dornan, 333 Cedar Croft Dr., Brick, NJ (US) 08724

( * ) Notice: Subject to any disclaimer, the term of this patent is extended or adjusted under 35 U.S.C. 154(b) by 0 days.

This patent is subject to a terminal disclaimer.

(21) Appl. No.: 09/894,456

(22) Filed: Jun. 29, 2001

(65) Prior Publication Data

US 2003/0001352 A1 Jan. 2, 2003

Related U.S. Application Data

(63) Continuation-in-part of application No. 09/257,736, filed on Feb. 25, 1999, now Pat. No. 6,254,113.

(51) Int. Cl.[7] ................................................. A63C 17/06

(52) U.S. Cl. ............................... 280/87.042; 280/11.25; 280/842; 280/843; 280/11.227

(58) Field of Search ....................... 280/11.212, 11.233, 280/11.226, 11.227, 842, 843, 87.041, 87.042, 11.25, 11.27

(56) References Cited

U.S. PATENT DOCUMENTS

| | | | | | |
|---|---|---|---|---|---|
| 2,460,395 | A | * | 2/1949 | Reid | 280/87.041 |
| 2,529,314 | A | * | 11/1950 | Schmid | 280/11.233 |
| 2,719,724 | A | * | 10/1955 | Lundgren | 280/11.233 |
| 3,891,225 | A | * | 6/1975 | Sessa | 280/87.042 |
| 3,995,873 | A | * | 12/1976 | Pantzar | 280/87.042 |
| 4,088,334 | A | * | 5/1978 | Johnson | 280/87.042 |
| 4,138,127 | A | * | 2/1979 | Kimmell et al. | 280/11.233 |
| 4,555,122 | A | * | 11/1985 | Harvey | 280/87.042 |
| 4,838,564 | A | * | 6/1989 | Jarvis | 280/11.28 |
| 4,844,492 | A | * | 7/1989 | Ludwig | 280/11.23 |
| 5,927,733 | A | * | 7/1999 | Banda | 280/87.041 |
| 5,984,328 | A | * | 11/1999 | Tipton | 280/87.042 |
| 6,254,113 | B1 | * | 7/2001 | Dornan | 280/87.042 |

* cited by examiner

*Primary Examiner*—Avraham Lerner
(74) *Attorney, Agent, or Firm*—Louis E. Marn; Clifford G. Frayne

(57) ABSTRACT

An all-terrain riding assembly comprised of a body member, including a supporting surface for feet of the user disposed between a front housing member having a rotatably mounted roller member and a rear housing member having a rotatably mounted, cylindrically-shaped roller member articulatedly mounted to the body member and including an assembly for controlling the rotational velocity of the rear roller member and thus linear velocity of the riding assembly.

17 Claims, 4 Drawing Sheets

ALL TERRAIN RIDING ASSEMBLY HAVING BRAKING CAPABILITIES

RELATED APPLICATIONS

This application is a continuation-in-part of U.S. Ser. No. 09/257,736, filed Feb. 25, 1999, now U.S. Pat. No. 6,254,113.

BACKGROUND OF THE INVENTION

1. Field of the Invention

This invention relates to a riding assembly and more particularly to an all terrain riding assembly.

2. Description of the Prior Art

Rollerskates, rollerblades, skateboards, rollerskis and the like, as means for riding on even terrain such as a road surface have been widely known and used for some time. Skateboards, in particular, have become widely developed and generally comprise a platform large enough for a person to stand on with his or her feet side by side, and front wheel and rear wheel mounted for rotation about spaced apart parallel axes, the wheels being of rounded profile to enable the platform to tilt laterally in use. It is generally intended that the user should stand on the platform with his or her feet on either side of the imaginary line joining the centers of the wheels and should balance himself or herself as the skateboard moves forward.

In the copending application, U.S. Ser. No. 09/257,736, hereby incorporated by reference, there is disclosed an all-terrain riding assembly comprised of a body member having a supporting surface for feet of the user disposed between a front housing member having a spherically-shaped rotatably mounted roller member and a rear housing member having a rotatably mounted generally cylindrically-shaped roller member wherein the rear housing member is articulately mounted to the body member.

While such riding assembly is capable of being directionally controllable by the user by the shifting of weight, the riding assembly is subject to gravitational forces with concomitant potential injurious hazard to the user.

OBJECTS OF THE INVENTION

An object of the present invention is to provide an all terrain riding assembly having an assembly to control the linear velocity thereof.

Another object of the present invention is to provide an all terrain riding assembly of lighter weight.

Still another object of the present invention is to provide an all terrain riding assembly capable of more facile steering and maneuverability during use.

A still further object of the present invention is to provide an all terrain riding assembly having a tension assembly to provide a more stable riding platform under varying terrain conditions.

SUMMARY OF THE INVENTION

These and other objects of the present invention are achieved by an all terrain riding assembly comprised of a body member including a supporting surface for feet of the user disposed between a front housing member having a rotatably mounted roller member and a rear housing member having a rotatably mounted elongated roller member with a manually operated assembly to control the rotational speed of the elongated roller member and thus linear velocity of the riding assembly, as more fully hereinafter described.

BRIEF DESCRIPTION OF THE DRAWINGS

These and other objects of the present invention will become more readily appreciated by reference to the following detailed description when taken with the accompanying drawings wherein like numerals designate like parts throughout and where.

DETAILED DESCRIPTION OF THE DRAWINGS

Figure 1:
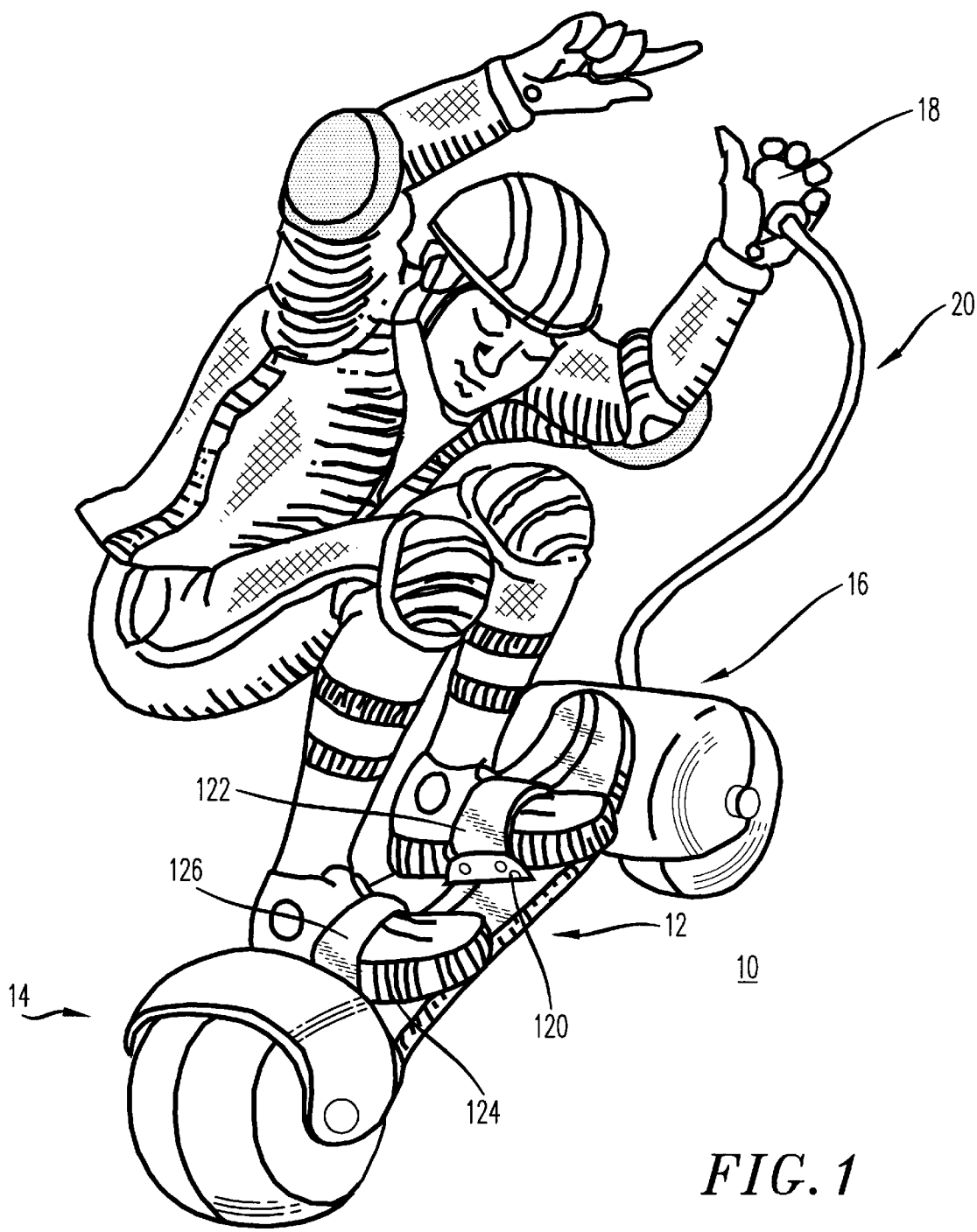
FIG. 1 is a perspective view illustrative of use of the all terrain riding assembly of the present invention.
Figure 2:
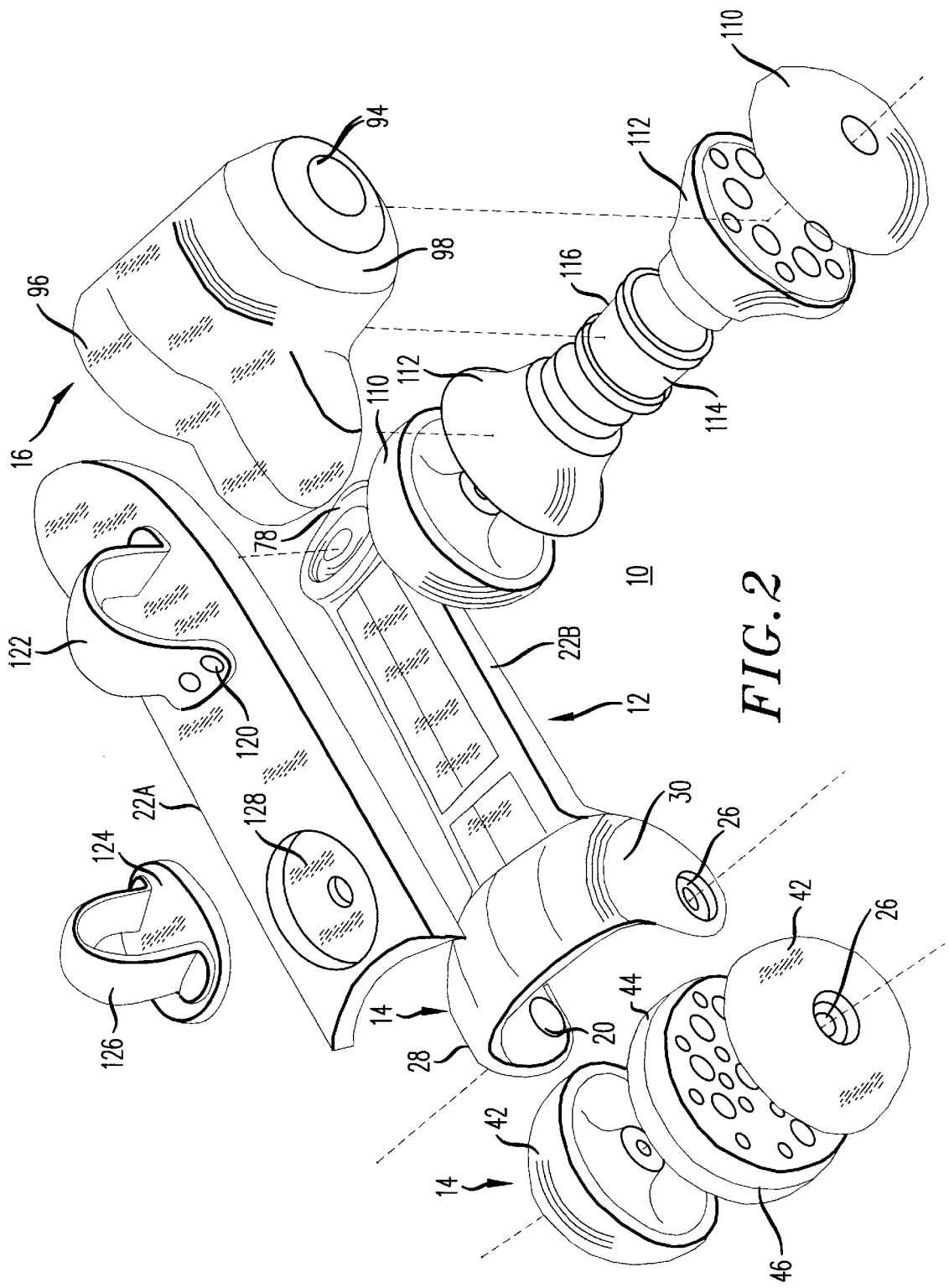
FIG. 2 is an exploded, somewhat schematic, isometric view of the all terrain riding assembly of the present invention.

Referring now to the drawings, and particularly FIGS. 1 and 2, there is illustrated an all terrain riding assembly, generally indicated as 10, comprised of a main body, generally indicated as 12, positioned between a front housing member and a rear housing member, generally indicated as 14 and 16, respectively. FIG. 1 illustrates an individual positioned on the all terrain riding assembly 10 grasping a bulb member 18 of a velocity control assembly, generally indicated as 20, and as more fully hereinafter described. The main body 12 and front housing member 14 are formed of a suitable plastic material and are of unitary construction as described in copending patent application U.S. Ser. No. 09/257,736.

Figure 5:
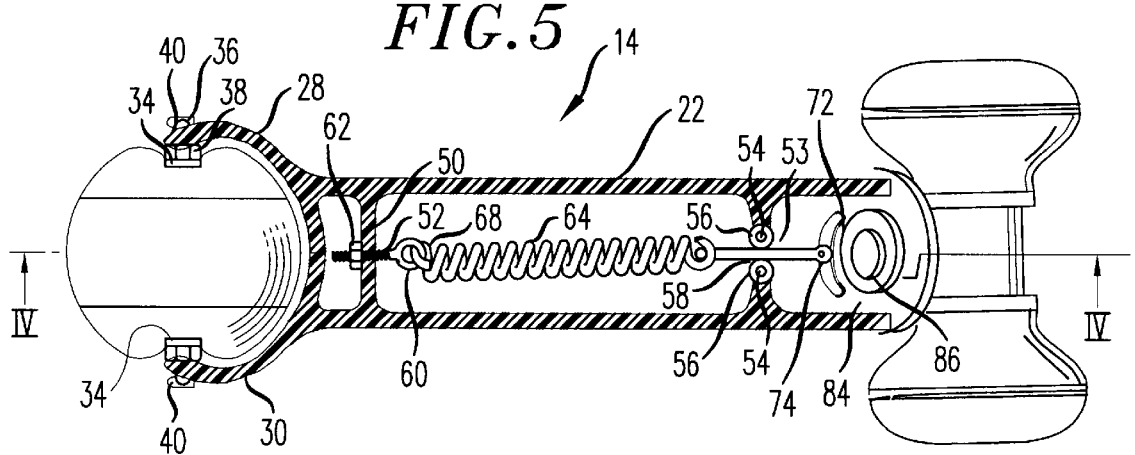
FIG. 5 is a sectional view of the all terrain assembly of the present invention taken along lines V—V of FIG. 4.

The main body 12 of the riding assembly 10, referring to FIGS. 2 and 5, is comprised of an elongated support member 22 having a supporting surface 24 of a length and width to support the feet of the user. It is noted that an upper portion 22A of the body member 10 in FIG. 2 is exploded apart from a lower portion 22B for illustrative purpose, it being understood that the upper and lower portions 22A and 22B are of unitary construction. The support member 22 extends to and is integrally formed with the front housing member 14. The front housing member 12 is quadra-spherically-shaped and having orifices 26 formed in left and right shoulder portions 28 and 30.

A spherically-shaped roller member, generally indicated as 32 including roller bearing members 34 is positioned for rotation on a shaft 36 including cylindrically-shaped spacer sleeve member 38 and mounted within the orifices 26, such as by bolts 40. The spherically-shaped tire or roller member 32 is formed of a flexible resilient material, such as rubber, ABS or the like, and is honeycombed to reduce weight of the riding assembly 10. Additionally, the tire or roller member 32 may be formed to be inflatable to a desired pressure as a function of its intended use and concomitant terrain conditions.

The roller member 32, referring particularly to FIG. 2 is comprised of hemispherically-shaped outer members 42 mounted to a disc-shaped intermediate member 44 having a contact surface 46. The members 42 are not solid; noting that the intermediate member is honeycombed for weight reduction.

Figure 3:
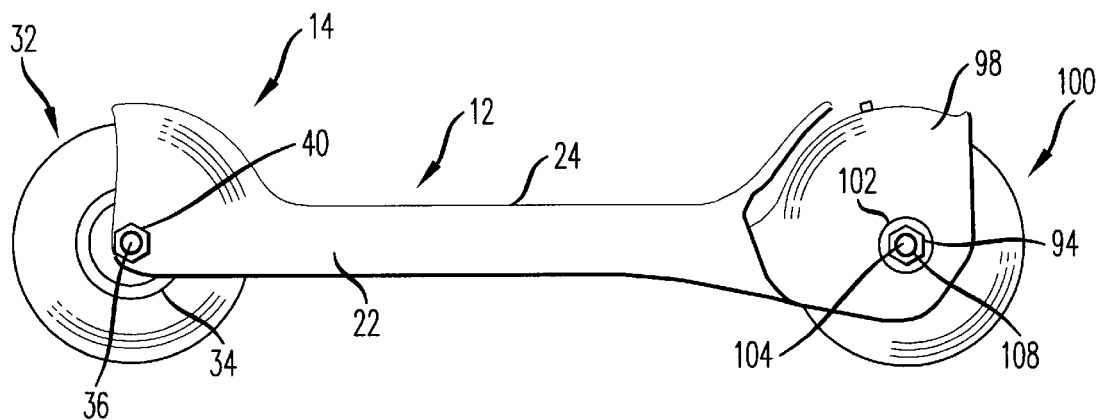
FIG. 3 is an elevational view thereof.

The main body member 12, referring again to FIGS. 3 and 5, is formed with a vertical disposed wall portion 50, including an orifice 52 proximate the front housing member 14. Positioned proximate the rear housing member 16 in the support member 22, there are provided paired shafts 54 including roller members 56 defining a channel 58, as more fully hereinafter described. An eyelet bolt 60 is disposed in the orifice 52 of the wall portion 50 and is affixed thereto, such as by a bolt 62. A spring member 64 is disposed within the support member 22 with an end 68 engaged to the eyelet bolt 60; an end remote therefrom is mounted to a rod member 70 extending through the channel 58 and through an elliptically-shaped channel 72. An end 74 of the rod member 70 remote from the portion mounted to the spring 64 is formed with an eyelet 76 for engaging a mounting member 78 formed on the rear housing member 14, as more fully hereinafter described.

The support member 22 proximate the rear housing member 16 is formed with a downwardly depending inclined portion 80 and an upwardly extending portion 82. The downwardly depending inclined portion 80 has a surface 84 and includes an orifice 86 to support a leading upwardly depending inclined portion 88 having a surface 90 including orifice 92 of the rear housing member 16. A bearing member 94 is positioned between the surfaces 84 and 88 of the support member 22 and rear housing member 16, respectively. A threaded lug 90 and nut 92 cooperate to rotatably support the inclined portion 80 of the support member 22 to the leading inclined portion 88 of the rear housing member 14. Thus, the rear housing member 16 is articulately mounted to the elongated support member 22, as described in the aforementioned copending application.

The rear housing member 16 is quadra-cylindrically-shaped and includes orifices 94 formed in right and left shoulder portions 96 and 98, thereof. A generally cylindrically-shaped roller member, generally indicated as 100, including roller bearing member 102 is positioned on a shaft 104 including cylindrically-shaped spacer sleeve member 106 mounted within the orifices 94, such as by bolt 108. The generally cylindrically-shaped roller member 100 is similarly formed of a flexible resilient material, as is the front spherically-shaped tire or roller member 32, and is preferably honeycombed for weight considerations.

Additionally, the generally cylindrically-shaped rear tire or roller member 100 may be formed of members to be inflatable to any desired pressure as a function of the intended use and concomitant terrain conditions.

The roller member 100, referring particularly to FIG. 2, is comprised of hemispherically-shaped outer members 110 mounted to hemispherically-shaped inner members 112 and a cylindrically-shaped intermediate member 114 having a bearing surface 116, as more fully hereinafter described.

The elongate support member 22 having a supporting surface 26 is provided with a rearwardly disposed fixed foot support 120 including strap member 122 and a forwardly disposed foot support 124 including strap member 126 positioned for rotation in a throughbore 128 formed in the elongated support member 22 and secured therein by a threaded nut. The foot support members 120 and 124 assists the user in operation of the all-terrain riding assembly 10.

As hereinafter discussed, the main body member 12 is rotatably disposed with respect to the rear housing member 16 thereby providing an articulating relationship therebetween to facilitate the user's ability to guide or steer the all-terrain assembly 10 of the present invention during operation. The surface portions 46 and 52 of the main body 18 and rear housing member 16 are formed at an angle of about 30 degrees to the horizontal axis of the support surface 18 of the main body member 12 to provide free rotational relationships therebetween. It will be understood by one skilled in the art that the articulating angle may be varied, it is chosen to provide facile cooperation between the articulating elements to provide required cooperation during use. By adjusting tension of the spring member 64, the relative force between the rear housing member 14 to the main body member 12 may be altered differing tension connections to facilitate safe and enjoyable use.

Figure 6:
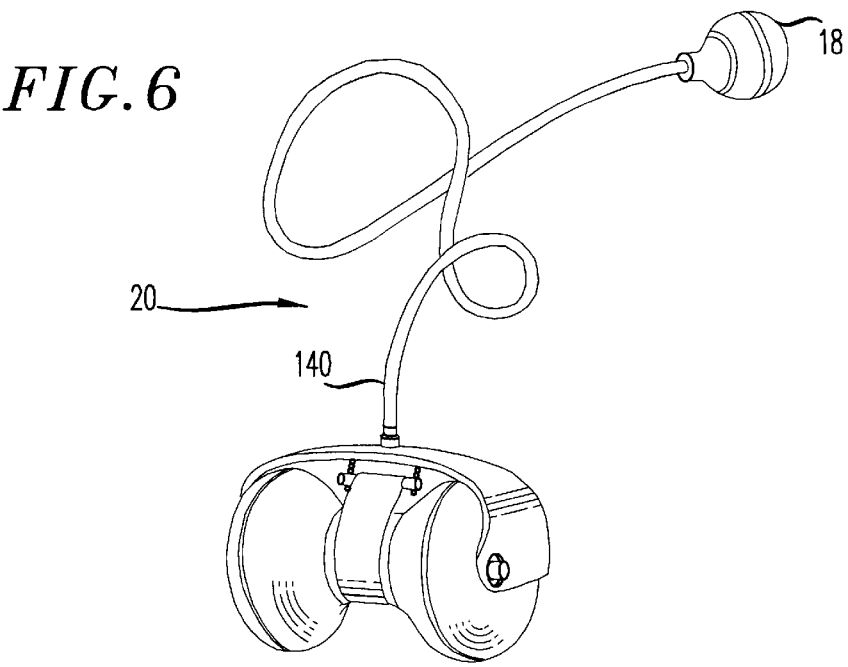
FIG. 6 is a schematic view of the velocity control assembly for the all terrain assembly of the present invention.

The velocity control assembly 20, referring now to FIGS. 1 and 6 is comprised of the hollow bulb member 18 connected via a tube 140 to an air piston member, generally indicated as 142 mounted within the rear housing member 16, such as by a bolt 144. The piston member 142 is disposed in paralleled relationship to the cylindrically-shaped intermediate portion 114 of the rear roller member 14. The air piston member 142 includes a chamber 146 in which is disposed a spring loaded piston member 148 including an arm member 150 connected to a lever member 152.

The lever member 152 is formed with a strap holding slot 154 for engaging one end of a strap member 156, such as by screw members 158 (one shown). The strap member 156 is coursed about a roller assembly 160 mounted within the rear housing 16, about the cylindrically-shaped intermediate portion 114 of the rear roller member 100 with a forward end 162 thereof affixed to a strap retaining member 164 mounted within the rear housing member 14.

Figure 4:
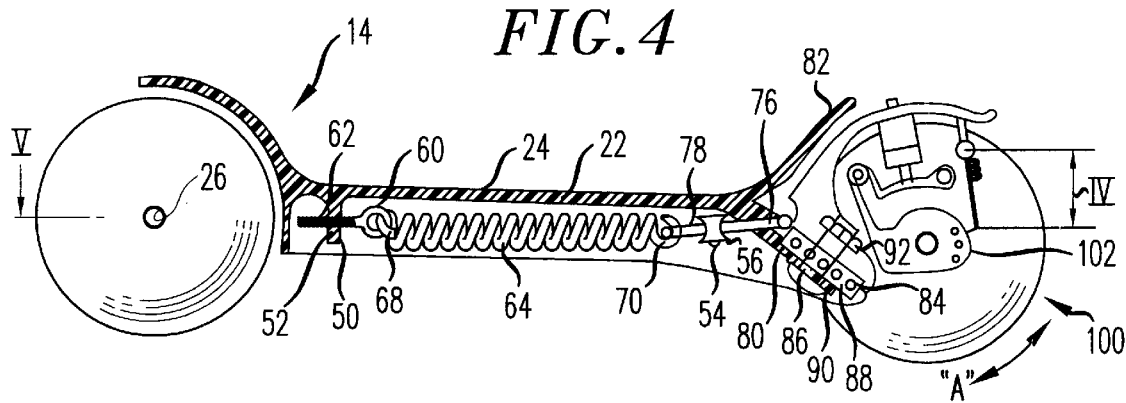
FIG. 4 is a sectional partial side view of the all terrain assembly of the present invention taken along lines IV—IV of FIG. 5.
Figure 7:
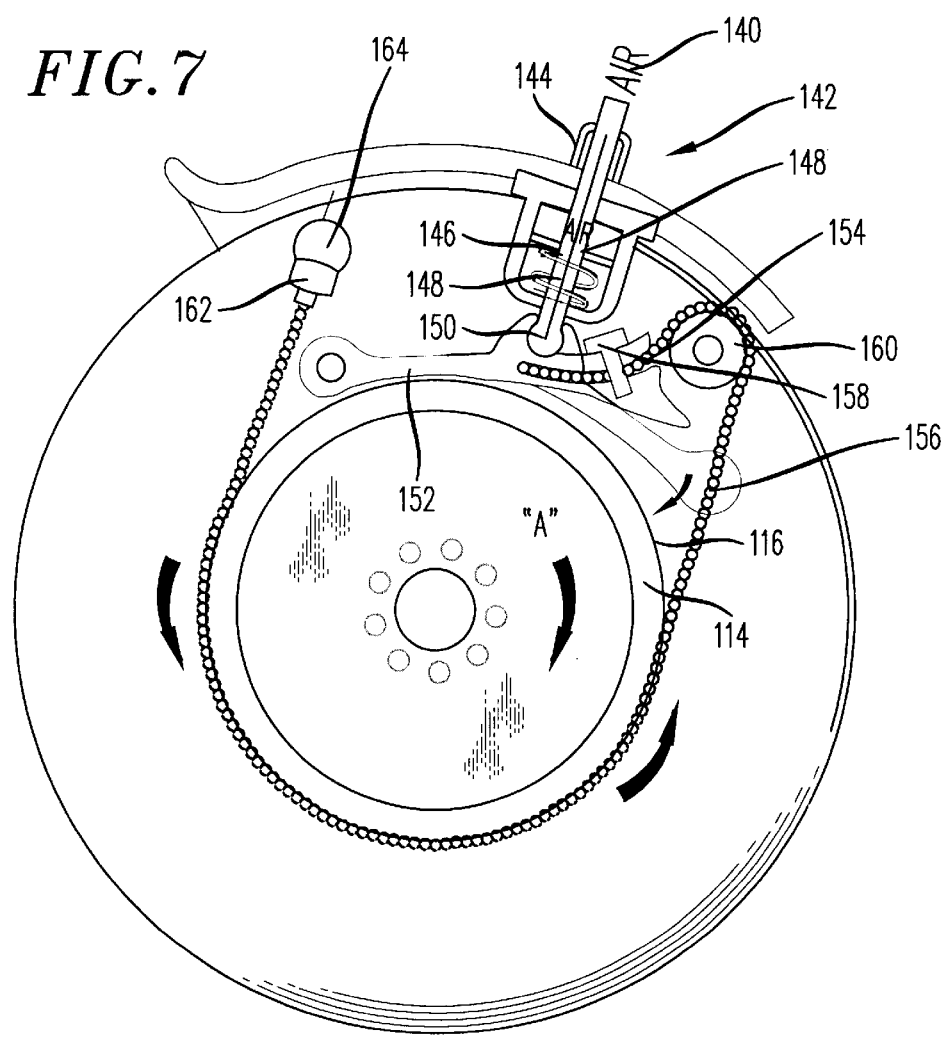
FIG. 7 is an enlarged view of the rear housing member and a portion of the velocity control assembly.

In operation, referring particularly to FIGS. 4 and 7, during use of the riding assembly 10, the rear roller member 100 is caused to rotate in the direction of the arrows "A". The user, upon squeezing of the bulb member 18, causes the piston member 148 within the air chamber 142 to be downwardly disposed and thus effect downward rotation of the lever member 152 about a pivot thereby causing the strap 152 to frictionally engage the surface 116 of the cylindrically-shaped intermediate member 114 of the rear roller member 100 and effect a reduction in the rotational velocity of the rear roller member 100 and thus reduced the linear velocity of the all terrain rising assembly 10.

The assembly 10 may be formed of any suitable material, e.g. metal, such as aluminum or steel, or a plastic material such as ABS, capable of supporting the weight of a user over both smooth terrain and irregular terrain without breakage after normal use. Thus, the materials and structural configuration are selected to provide design criteria for repetitive use of the assembly.

The quadra-spherically-shaped front member 14 is configured to provide close fitting, but non-interfering relationship to the tire or roller member 32, and is dimensioned to deflect and to prevent small impediments from lodging therebetween to interrupt rotation of the rotating member as well as to prevent inadvertent contact by the user to the rolling surfaces of tire or rolling members 32 and 100.

The tire or roller member are generally of like diameter and of from 6 to 12 inches, preferably about 8 to 10 inches, but may be as large as 16 to 20 inches. The width of the cylindrically-shaped member is preferably equal to the diameter thereof and may extend to a width of twice the diameter thereof.

Additionally, the preferred embodiment of the present invention includes a spherically-shaped front roller member 32 to provide more effective directional control whereby directional alteration of the front tire or wheel member cause the rolling axis thereof to more readily assume a great circle contacting relationship to the terrain. It will be understood by one skilled in the art that the front wheel or tire member may take other rotating shapes, e.g. oblately-shaped, however, a spherically-shaped front tire or wheel member provides greater stability and steering capabilities.

While the present invention has been described with respect to the exemplar embodiments thereof, it will be recognized by one of ordinary skill in the art that many modifications and changes can be made without departing from the spirit and scope of the invention. Therefore it is manifestly intended that the scope of the invention be limited only by the claims and the equivalents thereof.

I claim:

1. An all-terrain riding assembly which comprises:
   a main body member having a support surface for feet of a user and formed with a downwardly depending inclined portion extending towards a rear end of said main body member;
   front and rear housing members supporting said main body member, said rear housing member having an upwardly depending inclined portion positioned on said downwardly depending inclined portion and articulately mounted to said main body member;
   a spherically-shaped roller member assembly rotatably mounted within said front housing member;
   a generally cylindrically-shaped roller member rotatably mounted within said rear housing member.

2. The all-terrain riding assembly as defined in claim 1 and further including bearing means positioned between said downwardly depending inclined portion of said main body member and said upwardly depending inclined portion of said rear housing member.

3. The all-terrain assembly as defined in claim 1 and further including means for adjusting tension between said rear housing member and said main body member.

4. The all-terrain riding assembly as defined in claim 1 wherein said roller members are formed of a resiliant material.

5. The all-terrain riding assembly as defined in claim 1 wherein said spherically-shaped roller member is comprised of disc-shaped intermediate member sandwiched between semi-spherical shaped outer members.

6. The all-terrain riding assembly as defined in claim 5 wherein said disc-shaped intermediate member is honeycombed for weight reduction.

7. The all-terrain riding assembly as defined in claim 1 wherein said generally cylindrically-shaped roller member is comprised of hemispherically-shaped outer members mounted to hemispherically-shaped inner members and includes an intermediate member formed with a bearing surface.

8. The all-terrain riding assembly as defined in claim 7 wherein said hemispherically-shaped inner members are honeycombed for weight reduction.

9. The all-terrain riding assembly in accordance with claim 8 and further including a strap member coursed about said bearing surface with an end member of said rear housing member and an end mounted to a piston member of an air piston assembly mounted within said rear housing member whereby activation of said piston member by user causes said strap member to frictionally engage said bearing surface in response to user requirements thereby reducing the rotation velocity of said generally spherically-shaped roller members.

10. The all-terrain riding assembly as defined in claim 7 wherein said piston member of said air piston assembly is mounted to a lever member mounted within said rear housing member wherein said strap member is cause to engage said bearing surface during rotation of said lever member within said rear housing member.

11. The all-terrain riding assembly as defined in claim 1 wherein said means for adjusting tension between said main body member and said rear housing member is a spring member having an end mounted to said rear housing member and an end positioned on an eyelet of a threaded bolt mounted to said main body member whereby changing of relative position of said bolt member adjusts tensioning there between.

12. The all-terrain riding assembly as defined in claim 1 wherein said front housing member is quadra-spherically-shaped to receive said spherically-shaped roller member in close fitting relationship.

13. The all-terrain riding assembly as defined in claim 1 wherein said rear housing member is quadra-cylindrically-shaped to receive said generally cylindrically-shaped roller member in close fitting relationship.

14. The all-terrain riding assembly as defined in claim 1 wherein a plane defining said support surface of said main body member is below a plane defined by upper surface portions of said roller members.

15. The all-terrain riding assembly as defined in claim 1 and further including at least one foot support member mounted for rotation on said main body member.

16. The all-terrain riding assembly as defined in claim 1 and further including at least one foot support member mounted for rotation in said main body member.

17. The all-terrain riding assembly as defined in claim 9 wherein said air piston member is in fluid communication via a conduit with a bulb member whereby squeezing of said bulb member by user activates said air piston member to thereby reduce rotational velocity of said rear generally cylindrically-shaped rear roller member.

* * * * *